Dec. 14, 1965  M. D. BRAID  3,222,770
METHOD OF MAKING VALVE STEM RETAINER LOCKS
Filed Jan. 6, 1964  2 Sheets-Sheet 1

INVENTOR.
Murray D. Braid
BY
ATTORNEYS

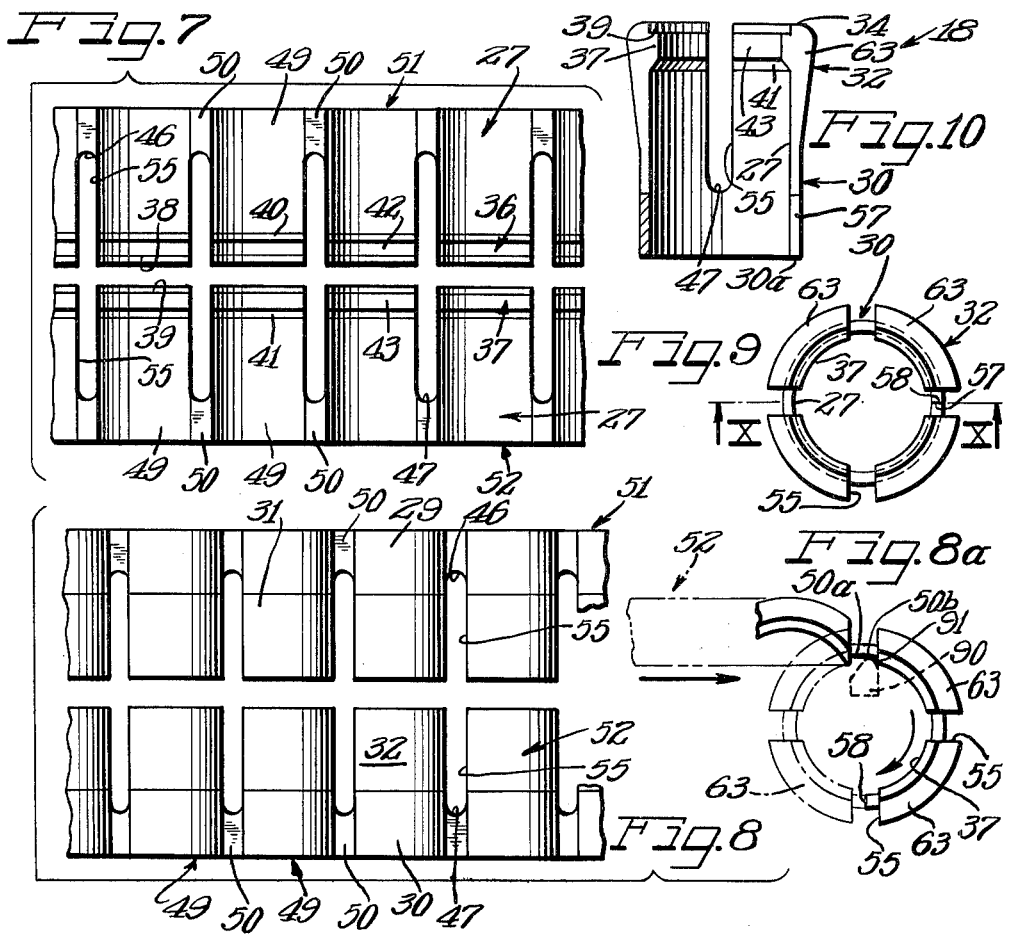

United States Patent Office 3,222,770
Patented Dec. 14, 1965

3,222,770
METHOD OF MAKING VALVE STEM
RETAINER LOCKS
Murray D. Braid, Mentor, Ohio, assignor to
TRW Inc., a corporation of Ohio
Filed Jan. 6, 1964, Ser. No. 335,731
14 Claims. (Cl. 29—413)

This invention generally relates to a method of manufacturing retainer locks and more particularly relates to a method of manufacturing one-piece tubular valve stem retainer locks from metal strip stock.

In conventional poppet valve assemblies the valve spring is bottomed on a retainer which is locked to the valve stem by multiple piece wedge lock segments. In such assemblies, the pippet valve stem has a peripheral groove near the tip end thereof for receiving ribs or heads of two-piece valve stem retainer locks which wedge fit in the tapered bore of the spring retainer. This invention now provides an inexpensive method of making improved one piece tubular retainer locks for valve stems. According to the invention metal strip stock is subjected to successive forming operations to shape the pieces into the required configuration and size without tool breakage.

Therefore, it is an object of the present invention to provide an improved method for manufacturing valve spring retainer locks.

It is another object of the present invention to provide a method for producing a one-piece valve spring retainer lock having a split tubular base portion and an expandible segmented arcuate upper portion.

It is another object of the present invention to provide a method of manufacturing a one-piece tubular valve spring retainer lock from a piece of strip material.

It is another object of the present invention to provide a method of manufacturing a valve retainer lock by forming a crimped sheet material with a plurality of slots therein and cutting the sheet into individual predetermined size pieces and shaping each individual piece to form a one-piece tubular retainer lock having a cylindrical passageway therethrough.

Other objects, features, and advantages of the present invention will become apparent to those skilled in the art after a careful consideration of the following description when taken in conjunction with the drawings wherein like numerals refer to like and corresponding parts.

In the drawings:

FIGURE 7 is a partial bottom view of the sheet material illustrated in FIGURE 6 after it has passed one of the manufacturing steps in accordance with the principles of the present invention;

FIGURE 8 is a partial top view of the sheet material illustrated in FIGURE 7;

FIGURE 8a is a partial side view of the sheet material of FIGURE 8 schematically illustrating a step of manufacture in accordance with the principles of the present invention;

FIGURE 9 is a top view of a one-piece valve retainer lock manufactured in accordance with the principles of the present invention;

FIGURE 10 is a longitudinal cross-sectional view with parts in elevation of the valve retainer lock taken along lines X—X of FIGURE 9;

FIGURE 11 is an end view of another sheet material that is used in accordance with the method of the present invention;

FIGURE 12 is a partial bottom view of the sheet material illustrated in FIGURE 11 after it has passed one of the manufacturing steps in accordance with the method of the present invention; and FIGURE 13 is a partial side view of the sheet material illutrated in FIGURE 11 after it has undergone manufacturing in accordance with the principles of the present invention.

As shown in the drawings:

Figure 1:
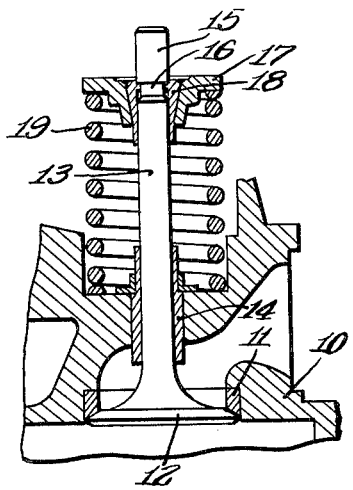
FIGURE 1 is a partial longitudinal cross-sectional view with parts in elevation of a poppet valve assembly equipped with a valve retainer lock constructed in accondance to the method of the present invention.
Figure 2:
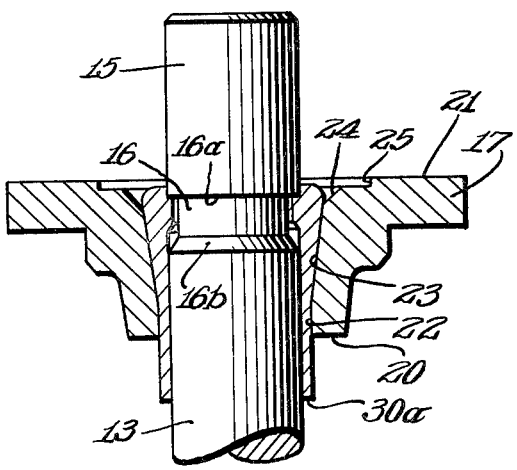
FIGURE 2 is an enlarged partial longitudinal cross-sectional view with parts in elevation of the poppet valve assembly illustrated in FIGURE 1.

Referring to FIGURES 1 and 2 the reference numeral 10 indicates generally an engine part such as, for example, a portion of the cylindrical head of an internal combustion engine. Seated within an appropriate recess in the cylinder head 10 is an annular valve seat insert 11 composed of a material capable of withstanding the high-temperatures and corrosive conditions to which the valve assembly is subjected. A poppet valve 12 is seated against the valve seat insert ring 11 and has a rod-like stem portion 13 slidably received within a valve stem guide 14. The tip end 15 of the stem 13 has a conventional retainer lock groove 16 having a flat top annular wall 16a and a lower frusto-conical wall 16b diverging toward the valve 12. A tubular valve spring retainer 17 having a one-piece valve spring retainer lock 18 is connected to the valve stem and lock. A coiled helical spring 19 surrounds the valve stem 13 and has one end bottomed against the spring retainer 17 and the opposite end bottomed against the stationary portion of the cylinder head 10 to resist opening movement of the valve and to return the valve to its closed position.

The tubular valve spring retainer has a bottom annular end 20 and a top annular end 21 with a bore therethrough having a bottom cylindrical bore 22 extending upwardly from the end 20, a frusto-conical bore 23 diverging upwardly from the cylindrical bore 22 and extending for a major length of the retainer bore and a bore 24 diverging from the bore 23 to a cylindrical counterbore 25. The valve spring retainer lock 18 is wedged in the valve spring retainer bore and may be moved axially relative thereto.

Figure 3:
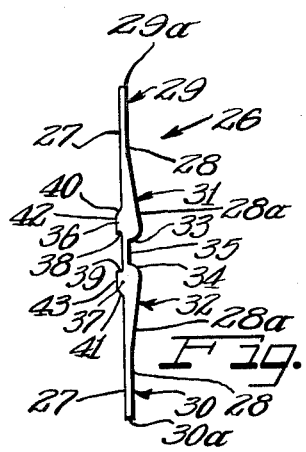
FIGURE 3 is an end view of a strip of sheet material used in the method of manufacturing the one-piece valve retainer lock.
Figure 4:
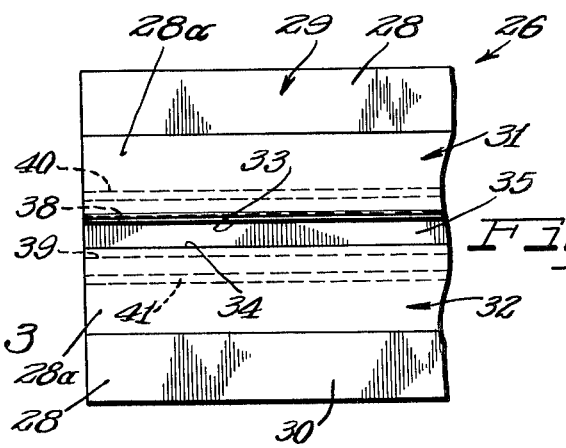
FIGURE 4 is a partial top view of the sheet material illustrated in FIGURE 3.

Referring to FIGURES 3 and 4, a metal sheet 26 is shaped with two longitudinally extending base portions 29 and 30 that have parallel top and bottom surfaces 27 and 28 that extend radially inwardly from their respective sides 29a and 30a for a predetermined distance which is less than one quarter of the width of the sheet 26; two longitudinally extending top portions 31 and 32, extending radially inwardly towards each other from the respective bottom portions 29 and 30 with their bottom surface 27 and their inclining top surface 28a to their spaced rounded inner side walls 33 and 34; a bridge portion 35 interconnecting the top portion inner side walls 33 and 34; and a pair of radially spaced longitudinally extending integral ribs 36 and 37, projecting from the inner portion bottom surface 27 and the ribs 36 and 37 having respective inner side walls 38 and 39 that preferably project perpendicular to the inner portion bottom surface 27 and spaced radially outwardly from the respective side walls 33 and 34, outer side walls 40 and 41 that incline from the inner portion bottom surface 27, and longitudinally extending bottom walls 42 and 43 interconnecting the side walls of the respective ribs 36 and 37.

Figure 5:
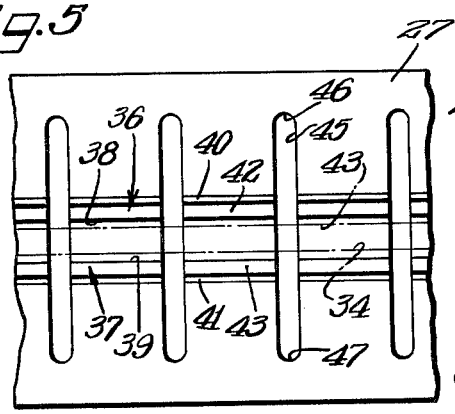
FIGURE 5 is a partial bottom view of the sheet material illustrated in FIGURE 4 after it has passed one of the steps of manufacture in the method of the present invention.

Referring to FIGURE 5, the shaped sheet 26 is transformed into a sheet 44 by being passed through suitable punch means to form a plurality of transversely extending holes 45 of predetermined width having rounded ends 46 and 47 that project into the base portions 29 and 30 respectively for less than half the width thereof. The holes are parallel and are preferably equally longitudinally spaced a predetermined distance from each other. However, it is understood that the holes may be spaced unequal distances from and not parallel to each other, if such is desired.

The holes 45 have transverse side walls for illustration purposes only and it is understood that the side walls will be tapered when it is desired to provide the tubular retainer lock 18 with rectangular slots.

Figure 6:
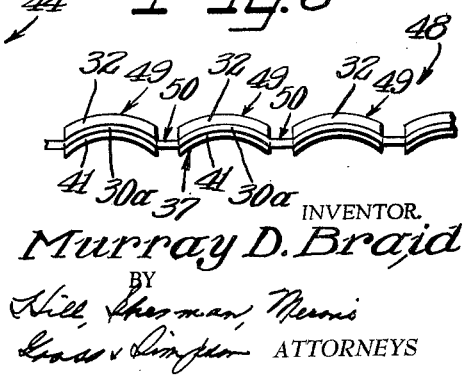
FIGURE 6 is a partial side view of the sheet material illustrated in FIGURE 5 after it has been through one of the steps of manufacture in accordance with the method of the present invention.

Referring to FIGURE 6, the sheet material 44 is transformed into a crimped sheet 48 by being passed through suitable coining means to form a plurality of spaced transversely extending and longtudinally spaced arcuate sections 49 interconnected by transversely extending flats 50. The arcuate sections 49 are formed by the transversely extending portions of the sheet 44 between the holes 45 and the flat portions 50 are formed by the transverse extensions of the holes 45. The radius of curvature of the arcuate sections 49 is preferably equal to the radius of the tubular retainer lock 18.

The crimped sheet 48 is passed through a severing operation where it is severed to form two severed or divided sheets 51 and 52 by suitable cutting means cutting along the end walls 33 and 34 to eliminate the bridge 35 (FIGURES 7 and 8). Each of the divided sheets 51 and 52 has transversely extending slots 55 extending from their sides 33 and 34 respectively into their respective base portions 29 and 30 and having rounded ends 46 and 47.

Then the severed sheets 51 and 52 are passed through a bending and cutting operation to form the valve spring retainer lock 18.

For example, FIGURE 8a, the sheet 51 is first cut along the transverse center line of one slot to form an end wall 58 and then progressively bent around a bending shoe 90 having an arcuate bending surface 91. The bending surface engages the bottom surface of the lands or flats 50 to bend the flats 50. The flat 50, approaching the bending shoe 90 has a straight portion 50a and a curved portion 50b bent or curved by the bending shoe. As the sheet is progressively passed over the bending shoe 90 it forms a retainer lock base portion 30 having a uniform radius of curvature with interference seal fit end walls 57 and 58. The end walls 57 is formed by cutting along the center line of another slot 55 after a predetermined length of the sheet has passed over the bending shoe 90.

It is of course understood that the severing or dividing operation of the sheet 48 may take place during or after the bending operation.

Referring to FIGURES 9 and 10 the retainer lock 18 is formed from the divided sheet 52 and has a base portion 30 and a top portion 32. The base portion 30 is formed into a split tube with the end walls 57 and 58 is joined to form a complementary interference seal fit with each other and thereby prevent oil leakage therethrough. The retainer 18 has a cylindrical bore formed by the inner wall surface 27 and its upper portion 32 gradually increases in thickness from the bottom or base portion 30 to its rounded end 34 because its outer wall surface 28a diverges from the outer cylindrical surface 28. Inwardly spaced a short distance from the end 34 is the rib 37 which projects radially from the inner surface 27. The rib 37 is in the top quadrant of the retainer lock 18 and has a flat radial top face 39 and a bottom wall surface 41 that diverges from the ridge inner wall face 43 at an angle of approximately 30° towards the inner cylindrical wall 27 of the upper portion 62.

Four slots 55 having parallel walls facing each other extend for a distance greater than one-half the length of the retainer lock from the end 34 through the top portion 32 into the bottom portion 30. The slots 55 have rounded end walls 47 ending in the bottom portion less than halfway through said bottom portion. The slots 55 are equally spaced from each other to provide four equal expandible arcuate segments 63.

In operation, FIGURE 2, the retainer lock 18 is inserted with its bottom end 30a passing through the counterbore 25. The frusto-conical surface 28a of the retainer lock and the frusto-conical wall 23 of the retainer 17 are shaped such that when the retainer is on the valve stem, the retainer lock outer wall 28a abuts the retainer wall 23 and the lower portion end walls 57 and 58 are in sealing engagement with each other. The frusto-conical shape of the retainer lock upper portion 32 is such that the lock 18 is wedged in the retainer 17. The lock ribs 37 have their upper walls 39 abutting the flat wall 16a of the valve stem groove, and their lower walls 41 spaced from the valve stem diverging wall 16b. This arrangement prevents the retainer 17 from rocking about the valve stem while permitting the retainer 17 to rotate relative to the valve stem. However, the valve retainer 17 may be moved axially relative to the retainer lock 18 so that its annular end wall 20 will move towards the end wall 30a.

Referring to FIGURE 11, a sheet of metal 64 is configured similar to half the sheet 26 of FIGURES 3 and 4. The sheet 64 has parallel longitudinally extending spaced side walls 68 and 69 and a longitudinally extending base portion 67 and a longitudinally extending top portion 67a therebetween. The top portion 67a has a transversely increasing thickness formed by the top surface 66 inclining to side wall 69, which is rounded at 70, from the bottom portion 67.

A longitudinally extending rib 71 projects from the bottom wall 65 and has a bottom face 72, a top side wall 73 forming a shoulder and a bottom side wall 74 declining from the face 72 to the bottom surface 65.

The sheet 64 is then passed through a slotting operation wherein a plurality of transversely extending rectangular slots 75, FIGURE 12, are formed therein to form a slotted sheet 77. The slots are spaced longitudinally a predetermined distance apart and extend from the side wall 69 into the base portion 67 to a rounded end wall 76.

Referring to FIGURE 13, the slotted sheet is then crimped as was the sheet 44, FIGURES 5 and 6 to form a crimped sheet 78 having transversely extending arcuate portions 79 formed between the slots 76 and transversely extending flat portions 80 interconnecting the arcuate portions and formed continuous with the slots as was described above.

The crimped sheet 78 is then passed through a bending machine wherein it is bent and cut at predetermined lengths along the transverse center line of the slots to form the one-piece retainer lock 18 (FIGURES 9 and 10).

Therefore, it is seen where I have provided an improved method of forming a one-piece valve spring retainer lock which may be suitably expanded in order to remove said retainer locks from engagement with a valve stem.

It is of course understood that although I have illustrated a retainer lock with four slots, a retainer lock having any number of slots and preferably three to six slots may be made by the method of the present invention by merely cutting the sheets 51, 52 and 78 with the desired number of slots needed.

Accordingly, it is to be understood that the devices and methods disclosed herein may be used for various other similar purposes and there may be various changes or modifications in the present teachings without departing from inventive concepts of the present invention which are intended to be embraced within the spirit and scope of the hereinafter appended claims.

I claim as my invention:

1. The method of forming a one-piece retainer lock comprising:

provending shaped sheet material with a longitudinally extending base portion that extends radially inwardly a predetermined distance from one side thereof, a longitudinally extending forward portion extending radially from the base portion to the other side wall, a longitudinally extending rib projecting from said forward portion adjacent the other side wall, and a plurality of transversely extending longitudinally spaced slots in said shaped sheet material with the end of each slot being a predetermined distance within the base portion, coining the sheet material to provide a crimped sheet having a plurality of transversely extending and longitudinally spaced arcuate sections, cutting the crimped sheet material along the transverse center line of one slot to provide one end wall, bending the sheet material around a suitable bending shoe, cutting the sheet material along the transverse center line of another slot to provide the other end wall, and joining said end walls to provide a split tubular retainer lock.

2. The method of forming a one-piece valve spring retainer lock comprising:

providing shaped sheet material with a longitudinally extending base portion that extend radially inwardly a predetermined distance from one side thereof, a longitudinally extending forward portion extending radially from the base portion to the other side wall, and a longitudinally extending rib projecting from the forward portion adjacent the other side wall, forming a plurality of transversely extending longitudinally spaced slots in said shaped sheet material with the end of each slot being a predetermined distance within the base portion, coining the sheet material to provide a crimped sheet having a plurality of transversely extending and longitudinally spaced arcuate sections being joined by transversely extending lands with said arcuate sections being formed by the transverse portions of said sheet material between said slots, cutting the crimped sheet material along the transverse center line of two slots which are spaced a predetermined distance apart to provide two end walls with at least two slots between said cut end walls and bending the crimped sheet around a suitable bending means to join the cut end walls to form a split tubular valve spring retainer lock.

3. The method of forming a one-piece retainer lock comprising:

providing shaped sheet material with a bottom surface and a top surface wherein the top surface has a longitudinally extending base portion that extends radially inwardly a predetermined distance from one side thereof and is parallel with the bottom surface, a longitudinally extending forward portion that inclines radially from the base portions to the other side wall, and a longitudinally extending rib projecting from said bottom surface adjacent said other side wall, forming a plurality of transversely extending longitudinally spaced slots in said shaped sheet material with the end of each slot being a predetermined distance within the base portion, coining the sheet material to provide a crimped sheet having a plurality of transversely extending and longitudinally spaced arcuate sections being joined by transversely extending lands with said arcuate sections being formed by the transverse portion of said sheet material between said slots, cutting the crimped sheet material along the transverse center line of two slots which are spaced a predetermined distance apart to provide two end walls and at least two slots between said cut end walls and binding the sheet material to join the cut end walls and form a one-piece split tubular retainer lock.

4. The method of forming a one-piece valve spring retainer lock comprising:

providing shaped sheet material with a longitudinally extending base portion that extends radially inwardly a predetermined distance from one side thereof, a longitudinally extending forward portion extending from the base portion for a predetermined distance with an increasing thickness to the other side wall, and a longitudinally extending rib projecting from said forward portion adjacent the other side wall, forming a plurality of transversely extending longitudinally spaced slots in said shaped sheet material with the ends of each hole being a predetermined distance within the base portion, coining the sheet material to provide a crimped sheet having a plurality of transversely extending and longitudinally spaced arcuate sections being joined by transversely extending lands with said arcuate sections being formed by the transverse portion of said sheet material between said slots, cutting the crimped sheet material along the transverse center line of two slots which are spaced a predetermined distance apart to provide two end walls and at least two slots between said cut end walls and bending the crimped sheet material to join the cut end walls and form a split tubular valve spring retainer lock.

5. The method of forming a one-piece valve retainer lock comprising:

providing shaped sheet material with two longitudinally extending base portions that extend radially inwardly a predetermined distance from the respective sides thereof, two longitudinally extending forward portions extending inwardly from the base portions for a predetermined distance and having side walls facing each other, a longitudinally extending bridging portion interconnecting said side walls, a pair of longitudinally extending ribs projecting from said forward portion and spaced a predetermined distance apart, and, a plurality of transversely extending longitudinally spaced holes in said sheet material with the ends of each hole being a predetermined distance within both base portions, coining the sheet material to provide a crimped sheet having a plurality of transversely extending and longitudinally spaced arcuate sections being joined by transversely extending lands, dividing the crimped sheet along the forward portion side walls to remove the bridging portion and provide two identical crimped strips each having a plurality of transversely extending slots therein, bending each crimped sheet to join the end walls thereof and provide the split tubular valve retainer locks.

6. The method of forming a one-piece valve retainer lock comprising:

providing shaped sheet with two longitudinally extending base portions that extend radially inwardly a predetermined distance from the respective sides thereof, two longitudinally extending forward portions extending inwardly from the base portions for a predetermined distance and having side walls facing each other, a longitudinally extending bridging portion interconnecting said side walls, and a pair of longitudinally extending ribs projecting from said forward portion and spaced a predetermined distance apart with their inner side walls being spaced radially outwardly from the forward portion side walls, forming a plurality of transversely extending longitudinally spaced holes in said shaped sheet with the ends of each hole being a predetermined distance within both base portions, coining the sheet to provide a crimped sheet having a plurality of transversely extending and longitudinally spaced arcuate sections being joined by transversely extending lands with said arcuate sections being formed by the transverse portion of said sheet between said holes, cutting the crimped sheet along the transverse center line of two holes which are spaced a predetermined distance apart and along the forward portion side walls to remove the bridging portion and provide two identical crimped strips having at least two transversely extending slots therein and two end walls, and bending the crimped sheet to push the flats upwards and joining the two end walls to provide a split tubular retainer lock.

7. The method of forming a one-piece valve retainer lock comprising:

providing shaped sheet with two longitudinally extending base portions that extend radially inwardly a predetermined distance from the respective sides thereof, two longitudinally forward portions extending inwardly from the base portions and having an increasing thickness, a longitudinally extending bridging portion interconnecting the side walls of said forward portions, and a pair of longitudinally extending ribs projecting from the bottom surface with their inner side walls facing each other and said inner side walls being spaced radially outwardly from the forward portion side walls, forming a plurality of transversely extending longitudinally space rectangular holes in said shaped sheet with the ends of each hole being a predetermined distance within both base portions, coining the sheet to provide a crimped sheet having a plurality of transversely extending and longitudinally spaced arcuate sections being joined by transversely extending lands with said arcuate sections being formed by the transverse portion of said sheet between said holes, cutting the crimped sheet along the transverse center line of two holes which are spaced a predetermined distance apart and along the forward portion side walls to remove the bridging portion and provide two identical crimped strips having at least two transversely extending slots therein and two end walls, and bending the crimped sheet to push the flats from their bottom surface towards their top surface and joining the two end walls such that the bottom surface of the sheet forms the inner cylindrical diameter of a split tubular retainer lock.

8. The method of forming a one-piece valve retainer lock comprising:

providing a shaped metal sheet with a bottom surface and a top surface wherein the top surface has two longitudinally extending base portions that extend radially inwardly a predetermined distance from the respective sides thereof and are parallel with the bottom surface, two longitudinally extending central surfaces that incline radially inwardly from the base portions for a predetermined distance and having side walls facing each other and spaced a predetermined distance apart, a longitudinally extending bridging surface interconnecting said side walls, and a pair of longitudinally extending ribs projecting from said bottom surface and spaced a predetermined distance apart with their inner side walls facing each other and said inner side walls being spaced radially outwardly from the side walls of the inclining surfaces, forming a plurality of transversely extending longitudinally spaced rectangular holes in said shaped sheet with the ends of each hole being a predetermined distance within both top surface base portions, coining the sheet to provide a crimped sheet having a plurality of transversely extending and longitudinally spaced arcuate sections being joined by transversely extending lands, cutting the crimped sheet along the transverse center line of two holes which are spaced a predetermined distance apart and along the side walls of the central inclining surfaces to remove the bridging surface and provide two identical crimped strips having at least two transversely extending slots therein and two end walls, and bending the crimped sheet to push the flats from their bottom surface towards their top surface and joining the two end walls, such that the bottom surface of the strip forms the inner cylindrical diameter of a split tubular retainer lock.

9. The method of forming a one-piece valve retainer lock comprising:

providing a shaped metal sheet with a bottom surface and a top surface wherein the top surface has two longitudinally extending base portions that extend radially inwardly a predetermined distance from the respective sides thereof and are parallel with the bottom surface, two longitudinally extending central surfaces that incline radially inwardly from the base portions for a predetermined distance and having side walls facing each other and spaced a predetermined distance apart, a longitudinally extending bridging surface interconnecting said side walls, and a pair of longitudinally extending ribs projecting from said bottom surface and spaced a predetermined distance apart with their inner side walls facing each other and said inner side walls being spaced radially outwardly from the side walls of the central inclining surfaces, forming a plurality of transversely extending longitudinally spaced rectangular holes in said shaped sheet with the ends of each hole being a predetermined distance within both base portions, coining the sheet to provide a crimped sheet having a plurality of transversely extending and longitudinally spaced arcuate sections being joined by transversely extending lands with said arcuate sections being formed by the transverse portion of said sheet between said holes, longitudinally dividing said sheet material along the side walls of the central inclining surfaces to remove the bridging surface and provide two identical crimped sheets having transversely extending slots therein, cutting the divided crimped sheets along the transverse center line of two slots which are spaced a predetermined distance apart to provide two end walls and at least two slots between said end walls, and bending each crimped sheet to push the flats from their bottom surface towards their top surface and joining the two end walls such that the bottom surface of the strip forms the inner cylindrical diameter of a split tubular retainer lock.

10. The method of forming a one-piece valve retainer lock comprising:

providing a shaped sheet with a bottom surface and a top surface wherein the top surface has two longitudinally extending base portions that extend radially inwardly a predetermined distance from the respective sides thereof and are parallel with the bottom surface, two longitudinally extending central surfaces that incline radially inwardly from the base portions for a predetermined distance and having side walls facing each other and spaced a predetermined distance apart, a longitudinally extending bridging surface interconnecting said side walls, and a pair of longitudinally extending ribs projecting from said bottom surface and spaced a predetermined distance apart with their inner side walls facing each other and said inner side walls being spaced radially outwardly from the side walls of the central inclining surfaces, forming a plurality of transversely extending longitudinally spaced rectangular holes in said shaped sheet with the ends of each hole being a predetermined distance within both base portions, coining the sheet to provide a crimped sheet having a plurality of transversely extending and longitudinally spaced arcuate sections being joined by transversely extending lands with said arcuate sections being formed by the transverse portion of said sheet between said holes, cutting the sheet along the transverse center line of two holes which are spaced a predetermined distance apart to provide two end walls and at least two holes between said end walls, longitudinally dividing the sheet along the side walls of the central inclining surfaces to remove the bridging surface and provide two identical crimped sheets having at least two transversely extending slots therein, and bending the crimped sheet to push the flats from their bottom surface towards their top surface and joining the two end walls such that the bottom surface of the sheet forms the inner cylindrical diameter of a split tubular retainer lock.

11. The method of forming a one-piece retainer lock comprising:

shaping and slotting a relatively flat sheet material to a predetermined shape with a plurality of longitudinally spaced transversely extending slots, coining said shaped and slotted sheet material between said slots to provide a crimped sheet, cutting the resulting crimped sheet material to provide two end walls, and bending the cut crimped sheet to join the cut end walls to form a one-piece split retainer lock.

12. The method of forming a one-piece retainer lock comprising:

providing a shaped sheet material with longitudinally extending diverging bottom and top surfaces, a longitudinally extending rib projecting from one of said surfaces at the diverging end of said sheet material, and a plurality of longitudinally spaced transversely extending slots, coining said sheet material between said slots to provide a crimped sheet, cutting the crimped sheet material to provide two end walls, and bending the cut crimped sheet to join the cut end walls to form a one-piece split retainer lock.

13. The method of forming a oone-piece retainer lock comprising:

shaping and slotting a relatively flat sheet material to a predetermined shape with a plurality of longitudinally spaced transversely extending slots, transversely crimping said shaped and slotted sheet material between said slots to provide a crimped sheet having a plurality of transversely extending and longitudinally spaced arcuate sections, cutting the resulting crimped sheet material to provide two end walls, and bending the cut crimped sheet to join the cut end walls to form a one-piece split retainer lock.

14. The method of forming a one-piece retainer lock comprising:

shaping and slotting a relatively flat sheet material to a predetermined shape with a plurality of longitudinally spaced transversely extending slots, coining said shaped and slotted sheet material between said solts to provide a crimped sheet having a plurality of transversely extending and longitudinally spaced arcuate sections, cutting the resulting crimped sheet material along the transverse center line of two slots to provide two end walls, and bending the crimped sheet to join the cut end walls to form a one-piece split retainer lock.

References Cited by the Examiner
UNITED STATES PATENTS

| 1,798,473 | 3/1931 | Kiley | 29—548 X |
| 1,823,009 | 9/1931 | Toaz | 29—417 |
| 2,697,274 | 12/1954 | Merrill | 29—414 |
| 2,704,882 | 3/1955 | Olson | 29—548 |
| 2,762,119 | 9/1956 | Jackson | 29—533 |
| 2,826,810 | 3/1958 | Peterson | 29—413 |
| 3,041,715 | 7/1962 | Norton | 29—417 |

WHITMORE A. WILTZ, *Primary Examiner.*

THOMAS H. EAGER, *Examiner.*